Patented May 23, 1950

2,508,359

UNITED STATES PATENT OFFICE 2,508,359

CORE BINDER

Franklin B. Baker, Chicago, Ill.; Rose C. Baker, executrix of said Franklin B. Baker, deceased No Drawing. Application February 21, 1947, Serial No. 730,212

3 Claims. (Cl. 127—38)

This invention relates to a new dextrinized starch-containing product for use as a core binder, and more particularly to such a binder produced from corn flour.

Over a period of several decades adhesive binders made from cereal grains have been used to facilitate the making of sand cores. A number of these binders used in the past and at the present time consist of commercially pure starch which has either been previously dextrinized or gelatinized. Gelatinized corn flour has also been used as a core binder. Each of these binders are good for certain purposes but are not entirely free from various disadvantages. For example, the dextrinized starch, when brought into contact with moist sand, liquefies quickly and becomes tacky or sticky almost instantaneously and thereby makes it difficult for the dextrine to be uniformly distributed throughout the sand in the mixing machine.

Another difficulty experienced in the use of dextrine as a core binder resides in the fact that whenever enough dextrine is used in the core sand to give sufficient binding effect, it makes the moist core sand so extremely sticky that the sand sticks to the core boxes and it is impossible to separate the green cores cleanly from the core boxes. Hence the core maker has to compromise in the use of dextrine and use less of it than he might like to use for a good strong core, in order to avoid harmful stickiness in the core box.

As is well known, various oils such as linseed oil, fish oil and other oils are used to give hardness to the baked cores, but the more oil used the less porosity or permeability the baked cores will have, and accordingly gases are not readily vented when porosity is insufficient. Hence, while oil is desirable, it must be used with full recognition of this factor, for if gases are not vented properly blow-holes will be found in the castings, necessitating their rejection.

Gelatinized starch or corn flour exhibits a pronounced tendency to swell and gel upon admixture with wet sand, hence is useful in enabling a core to retain its molded shape while still unbaked. However, such adhesive power as this binder has on the green sand is lost in the baking.

Efforts have been made to dextrinize the starch contained in dry milled wheat flour for use as a sand core binder. The dextrinization of this material, however, has not met with success due to the protein and fibre present, there being a strong tendency for the wheat flour to ball up during acidification and also during dextrinization, thereby interfering with or preventing the attainment of a uniform dextrinization.

My invention resides in the discovery that dry milled corn flour may be successfully dextrinized under certain conditions of operation, and when this is done a core binder is produced which is superior in many respects to the commonly used dextrinized pure starch. This discovery has been made in the face of the general belief and experience that corn flour could not be successfully dextrinized because of its content of proteins, fibre and fats, it being generally thought that the proteins, fibre and fats must all first be separated from the starch and the starch alone dextrinized. I have found that of the non-starch ingredients of corn flour only a portion of the fat need be separated from the starch in order to permit the effective dextrinization of the latter for core binding, if dextrinized in accordance with my invention.

Dextrinized corn flour produced in accordance with my invention is less dusty than dextrinized starch, does not become sticky or tacky as rapidly as does pure dextrinized corn starch, and therefore it may be more readily and uniformly mixed with the moist sand. Therefore, when mixed with the core sand the cores may be cleanly separated from the core boxes, the cores come out true to their full dimensions, and no adhering sand remains to be cleaned out before the box is re-used. However, a core containing this corn flour binder will, when baked, have the advantage of the dextrine, which tends to migrate to the surface of the core during the drying operation to harden the shell of the core, but leaving its center softer and hence more frangible. The protein in the binder develops adhesive qualities during the baking and hence cooperates in the production of firm cores, a particular advantage in large or intricate cores. The effect of the dextrinization treatment on the non-starch ingredients, and the precise nature of their function in the finished product, are not known but in any event the non-starch ingredients in combination with the starch, both treated in accordance with my invention, are observed to produce a superior core binder which binds well and permits gas escape very readily.

Corn flour dextrinized in accordance with my invention may be used alone as a core binder or may be used by adding it dry to a gelatinized starch or flour made for core binding. Usually my new binder will be used with gelatinized starches or flours and some core oil.

The general object of the invention, therefore, is to produce a core binder made by dextrinizing corn flour.

Another object of the invention is to provide a simple and economical process for producing such a core binder.

Further particular objects and advantages of the invention will become apparent or will be hereinafter referred to in this specification.

The following example is intended to illustrate one procedure which may be followed in producing this product, but it is not intended that the invention should be considered as limited to the precise details of this example.

5,250 cc. of 18° Bé. hydrochloric acid are mixed with 5,000 cc. of water for treatment of 1,000 pounds of corn flour, which is 13.3 lbs. of 18° Bé. acid per 1000 lbs. of corn flour, partially de-germinated. This acid gradually is sprayed into all or part of the flour. The flour is thereafter placed in a heated dextrinizing drum or tank provided with agitators. The flour is therein heated until it attains a temperature range of 310° to 350° F., which may be accomplished in 2½ to 5 hours, depending upon the ratio of heating surface to weight of material and the temperature differential between the heating medium and the material. It is found that treatment in this manner will on the average yield about the right degree of dextrinization for the purpose to which this product is put. The extent of the conversion treatment is determined by carrying it as far as can safely be done to attain high solubility, which will yield maximum adhesiveness, but avoiding charring, burning, lumping, solidifying and other symptoms of over-conversion. In general, maximum adhesiveness is the result of dextrinizing all, or substantially all, of the starch present.

In place of hydrochloric acid I may use nitric acid or a mixture of the two acids, or chlorine gas.

This type of treatment is known as dry dextrinization and the resulting product would be comparable in color with a dextrinized starch known in the trade as a canary dextrine. The product after dextrinization should be cooled and screened to assure the removal of any lumps or foreign particles, and is sufficiently dry for packaging when the dextrinization and cooling is completed.

The corn flour used for the process is usually produced by a dry milling process and may vary somewhat in its starch, protein, fat and fibre content, dependent upon the type and condition of the corn from which the flour is obtained. Part of the germ is removed during the milling process. However, in general, the starch content of the corn flour may vary from about 70 to 79% of the total solids, the protein may vary from about 7 to 10%, and the moisture from 10 to 14%. Fibre may vary from about 1 to 3% and fat should average about 2% or less.

After the dextrinization treatment above described, examination of the product reveals that the water soluble solids (chiefly dextrine) vary from 80 to 85% and the reducing sugars, calculated as dextrose, vary from 2 to 3%.

This analysis indicates a high and successful degree of dextrinization of the starch in a product not heretofore considered dextrinizable on a commercial basis. In fact, the analysis indicates that substantially all of the starch present has been dextrinized and that throughout any batch the dextrinization is uniform. When my procedure is followed, no difficulty is experienced with lumping or balling up. Considerable uncombined acid will remain in the finished product, which is a valuable feature of the product if it be combined later with gelatinized starch.

To those who are familiar with the dextrinization of commercially pure starch it will be observed that I employ a temperature range lower than is customarily used in the dextrinization of starch to obtain dextrine of similar color. Such temperatures for starch dextrinization usually are in the range of 350° to 390° F.

In the dextrinization of starch much less acid is used in the process, for example, anywhere from 1/7 to 1/20 as much acid as I employ, and varying with the solubility and color desired. While there may appear in the literature of this art an occasional statement suggesting that rather wide variations in the use of acid in starch dextrine manufacture may be indulged in, such statements are given no weight by those who from actual plant experience know that the use of acid for this purpose is a matter of delicate manipulation, as, indeed, is every factor in dextrine manufacture.

While the foregoing example illustrates one manner in which the invention may be practiced it should be understood that some modification in the process is permissible without departing from the scope of the invention, particularly as defined in the appended claims. Some variation in the proportions of acid, water and flour may be practiced, also the time and temperature may be varied. In general, if less acid is employed, more time and more heat may properly be used in order to accomplish the same amount of dextrinization.

The hydrochloric acid used may vary from 10.6 lbs. to 16 lbs. (18° Bé. HCl) per 1000 lbs. of corn flour.

A higher temperature differential in general will require less time, but a final temperature of the material above the range I have stated is not recommended. The degree of dextrinization may also be varied to some extent as may be desired or required for any particular problem in core binding, but in general maximum dextrinization will be required. The illustrative example, if followed, will yield a core binder excellently suited for blending with other binders, or for use alone.

When the core maker wishes to use oil in the core sand, which is common practice, he may attain sufficient final core hardness yet use less oil if his binder also includes the dextrinized corn flour made in accordance with this invention.

I claim as my invention:

1. A method of producing a core binder consisting of highly soluble dextrinized corn flour comprising spraying a quantity of partially de-germinated corn flour having a starch content of about 70 to 79% with a diluted solution of 18° Bé. hydrochloric acid, employing about 10.6 to 16 pounds of 18° Bé. acid per 1000 pounds of flour, thereafter subjecting the acidified corn flour to a roasting temperature of between 310° and 350° F., and terminating the dextrinizing operation when substantially all of the starch present has been dextrinized, yielding a product containing about 80% water soluble solids, and constituting a uniform free-running powdery material free from lumps or grits.

2. A method of producing a core binder consisting of highly soluble dextrinized corn flour comprising spraying a quantity of partially de-germinated corn flour with a diluted solution of 18° Bé. hydrochloric acid, employing about 13 pounds of 18° Bé. acid per 1000 pounds of flour, thereafter subjecting the acidified corn flour to a roasting temperature of between about 310° F. and 350° F., and terminating the dextrinizing operation when substantially complete dextrinization of the starch present has been accomplished, yielding a product containing about 80% water soluble solids, and constituting a uniform free-running powdery material free from lumps or grits.

3. A method of producing a core binder consisting of highly soluble dextrinized corn flour from a partially de-germinated corn flour having a starch content of from 70 to 79%, a protein content of 7 to 10%, a fiber content exceeding 1% but not 3% and a fat content of 2% or less, comprising spraying a quantity of the corn flour with a diluted solution of 18° Bé. hydrochloric acid, employing about 10.6 to 16 pounds of 18° Bé. acid per 1000 pounds of flour, thereafter subjecting the acidified corn flour to a roasting temperature of between about 310° F. and 350° F., and terminating the dextrinizing operation when substantially all of the starch present has been dextrinized, yielding a product containing about 80% water soluble solids, and constituting a uniform free-running powdery material free from lumps or grits.

FRANKLIN B. BAKER.

REFERENCES CITED

The following references are of record in the file of this patent:

UNITED STATES PATENTS

| Number | Name | Date |
|---|---|---|
| 20,347 | Hoffmann | May 25, 1858 |
| 226,398 | Furbish | Apr. 13, 1880 |
| 248,904 | Wilson et al. | Nov. 1, 1881 |
| 1,938,574 | Bauer | Dec. 12, 1933 |
| 2,148,525 | Bauer et al. | Feb. 28, 1939 |

OTHER REFERENCES

Walton, "Comprehensive Survey of Starch Chemistry," vol. 1, 1928, Chem. Cat. Co., N. Y., pages 162–167.